J. W. WILLIAMS.
WHEEL.
APPLICATION FILED MAR. 22, 1917.
1,337,869.
Patented Apr. 20, 1920.
3 SHEETS—SHEET 1.
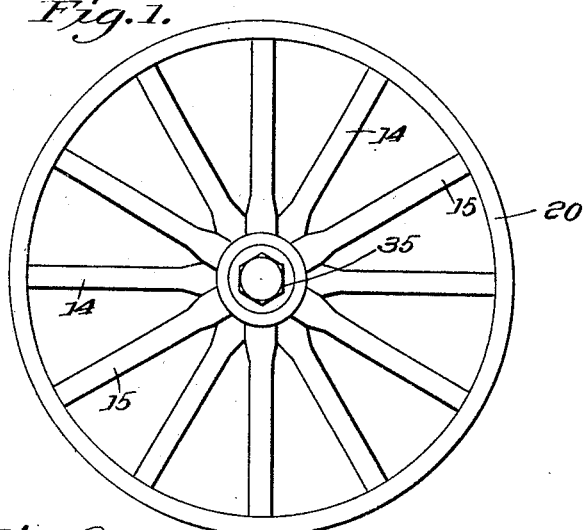
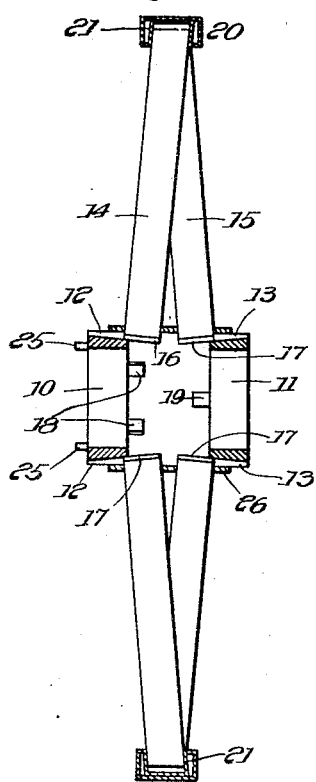
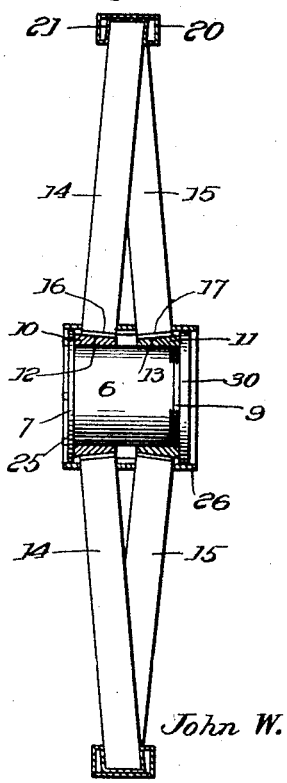
Inventor
John W. Williams
By Harry C. Schroeder
Attorney

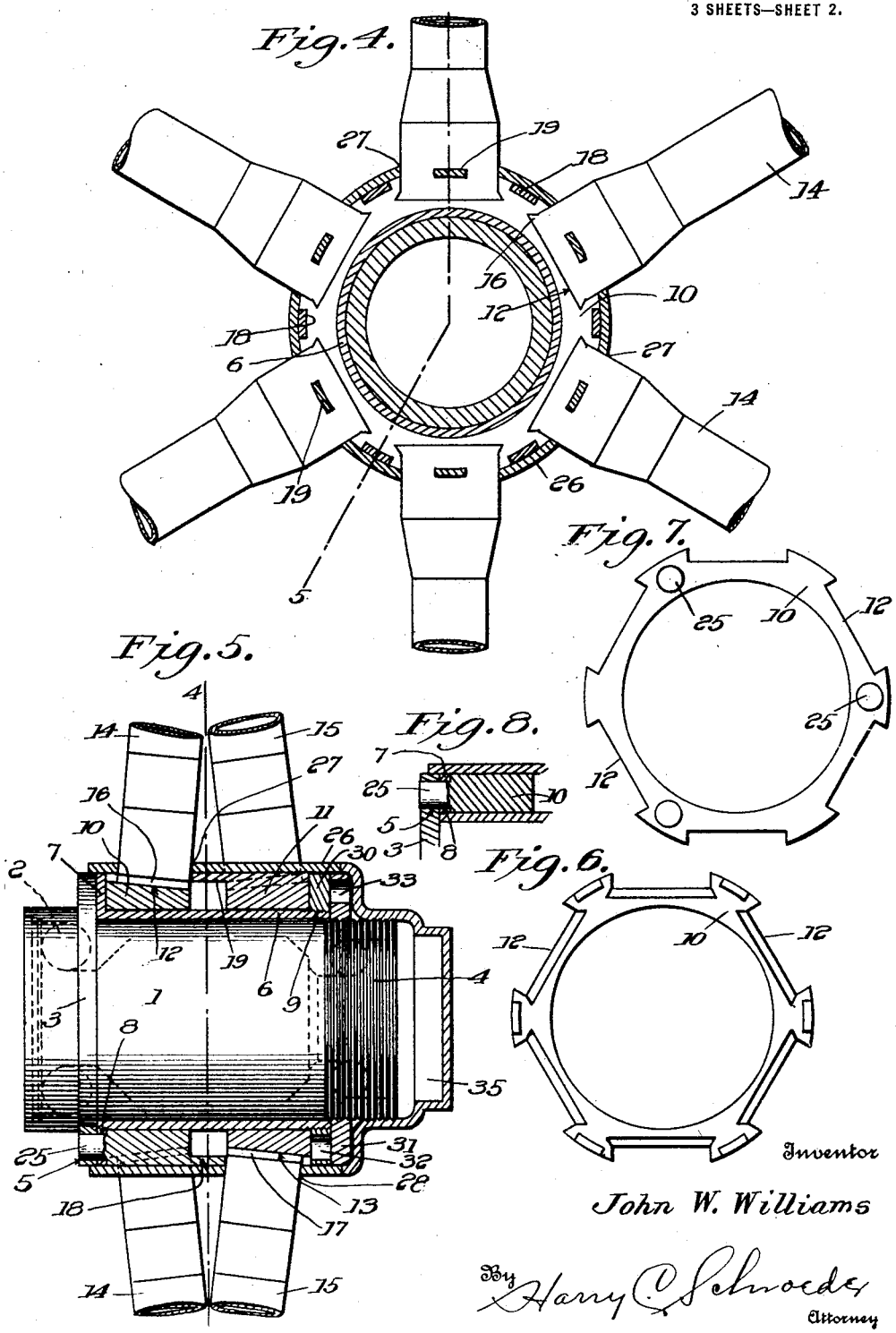

J. W. WILLIAMS.
WHEEL.
APPLICATION FILED MAR. 22, 1917.
1,337,869.
Patented Apr. 20, 1920.
3 SHEETS—SHEET 3.
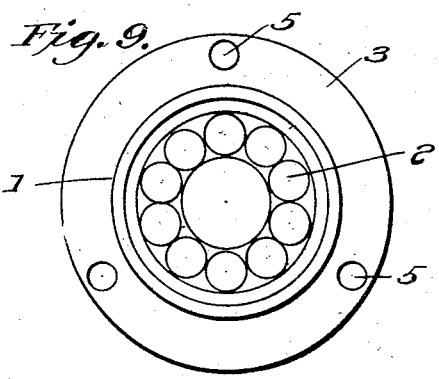
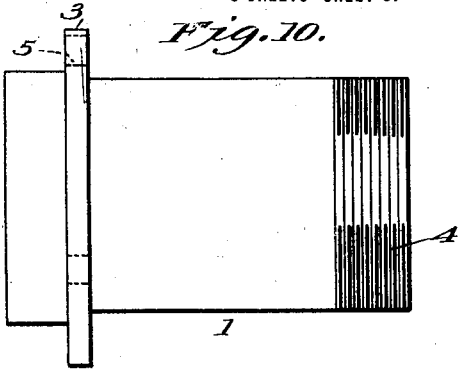
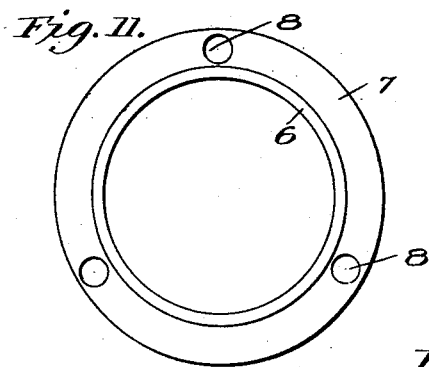
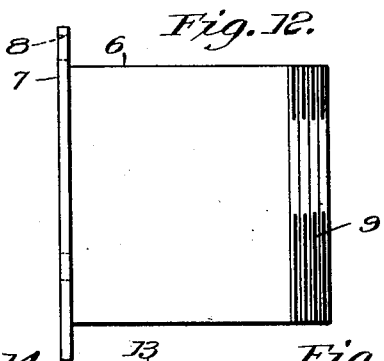
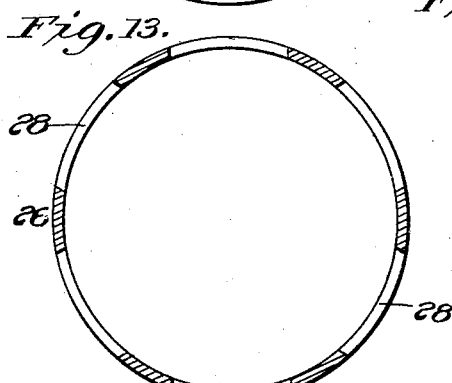
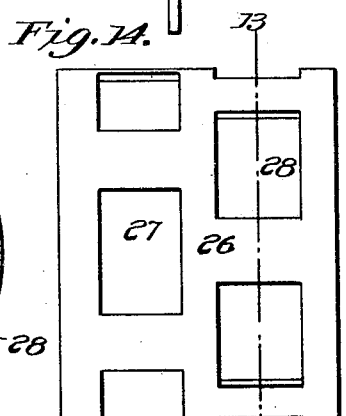
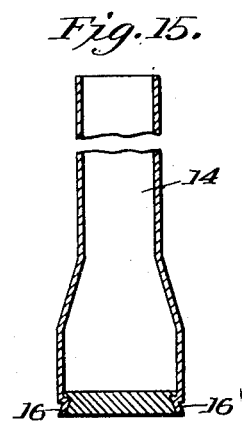
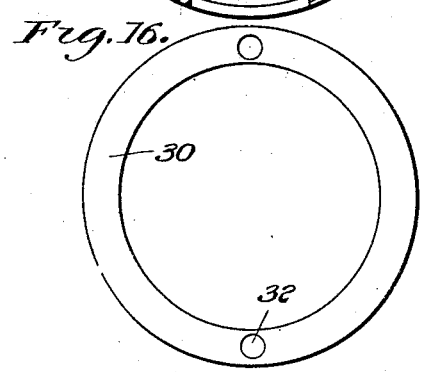
Inventor
John W. Williams
By Harry C. Schroeder
Attorney

UNITED STATES PATENT OFFICE.

JOHN W. WILLIAMS, OF SANTA ROSA, CALIFORNIA, ASSIGNOR TO WESTERN STEEL AUTO-WHEEL COMPANY, OF RENO, NEVADA, A CORPORATION.

WHEEL.

1,337,869.  Specification of Letters Patent.  Patented Apr. 20, 1920.

Application filed March 22, 1917. Serial No. 156,568.

*To all whom it may concern:*

Be it known that I, JOHN W. WILLIAMS, citizen of the United States, residing at Santa Rosa, in the county of Sonoma and State of California, have invented certain new and useful Improvements in Wheels, of which the following is a specification.

The invention relates to automobile wheels.

The invention contemplates an improved automobile wheel of the staggered spoke type, the parts of which are interchangeable. The parts of the wheel may all be of metal.

The invention consists in certain novel features of construction and arrangement of parts hereinafter described and pointed out in the claims.

The invention is illustrated in the accompanying drawings which form part of this specification and the claims.

Referring to the drawings:—

Figure 1 is a front view of the wheel.

Figs. 2 and 3 are sectional views of wheel illustrating how the parts of the wheel are assembled.

Fig. 4 is a sectional view of the inner portion of the wheel taken on line 4 of Fig. 5.

Fig. 5 is a sectional view of the inner portion of the wheel with the parts thereof all assembled.

Fig. 6 is an inner end view of one of the spoke seats.

Fig. 7 is an outer end view of the rear spoke seat.

Fig. 8 is a fragmentary sectional view illustrating the hub, hub sleeve and hub seat pinned together.

Fig. 9 is a front end view of the wheel hub.

Fig. 10 is a side view of the hub.

Fig. 11 is a front end view of the hub sleeve.

Fig. 12 is a side view of the hub sleeve.

Fig. 13 is a cross sectional view of the spoke sleeve taken on line 13 of Fig. 14.

Fig. 14 is a side view of the spoke sleeve.

Fig. 15 is a longitudinal section of one of the spokes.

Fig. 16 is a face view of the hub sleeve nut.

In the drawing 1 indicates the hub of the wheel in which are arranged ball bearings 2 whereby the hub is journaled on an axle. The hub has an annular rear flange 3 and is provided with a thread 4 on its front end. The hub flange is provided with pin holes 5. A hub sleeve 6 fits over hub 1 and has a rear flange 7 adapted to engage the hub flange 3. The hub sleeve flange is provided with pin holes 8 adapted to register with pin holes 5 in the hub flange. The front end of the hub sleeve has a thread 9. A rear ring spoke seat 10 fits on the rear of the hub sleeve against the hub sleeve flange 7, and a front ring spoke seat 11 fits on the front end of the hub sleeve. The rear spoke seat has a plurality of axially-extending, dove-tailed, spoke-seat grooves 12, which are inclined axially, rearwardly and outwardly. The front spoke seat has a plurality of axially extending, dove-tailed, spoke-seat grooves 13, which are inclined axially, forwardly and outwardly. The wheel has a plurality of spokes 14 and 15, which may be of tubular metal. The inner or hub ends of the spokes 14 and 15 have inclined dove-tailed tongues 16 and 17 adapted to fit in the grooves 12 and 13 in the spoke seats 10 and 11 respectively. Lugs 18 and 19 are formed on the inner ends of the spoke seats 10 and 11, respectively, for engaging the spokes 14 and 15 for the purpose hereinafter described.

The wheel has a felly 20 on which are formed sleeves 21 into which extend the outer ends of the spokes whereby the felly is connected to the spokes. Pins 25 project rearwardly from the rear of the rear spoke seat 10, through the holes 5 and 8 in the hub sleeve flange 3 and hub flange 7, respectively, whereby the hub, hub sleeve and said spoke seat are locked so as to turn together. A spoke sleeve 26 fits over the spoke seats 10 and 11 and is provided with openings 27 and 28 staggered with relation to each other through which openings the spokes extend whereby the inner ends of the spokes are properly positioned. A nut 30 screws on the thread 9 on the front end of hub sleeve 6 within the spoke sleeve, against the front end of the front spoke seat 11, and in conjunction with hub sleeve flange 7 engaging the rear end of rear spoke seat 10. Said nut draws the front and rear spoke seats toward each other until the spoke seat lugs 18 and 19 engage the inner sides of the spokes, whereby the spokes 14 and 15 are wedged outwardly an equal distance and the felly 20 is properly centered on the outer ends of the spokes with relation to the hub portion of the wheel so that the spokes 14 and 15 will receive an equal pressure.

A nut 31 screws on the thread 4 on the front end of the hub 1 against the front end of hub sleeve 6 and nut 30, whereby the hub is drawn forwardly within said sleeve until the hub flange 3 engages the hub sleeve flange 7, thus properly positioning the hub with relation to the hub sleeve and the rest of the wheel. The nuts 30 and 31 are provided with wrench apertures 32 and 33 to receive a wrench whereby the nuts are turned. A cap 35 screws on the thread 9 on the front end of the hub against the front end of spoke sleeve 26 and incloses the front end of hub and spoke sleeve. The hub sleeve flange 7 and hub flange 3 fit within and close the rear end of the hub sleeve 26.

The wheel is assembled as follows:

The inner ends of the spokes 14 and 15 are first introduced through the openings 27 and 28 in the hub sleeve 26; the outer ends of the spokes are introduced into the sleeves 21 of felly 20; and the rear and front spoke seats 10 and 11 are introduced within the rear and front ends of the spoke sleeve with the spoke seat grooves 12 and 13 in registration with the tongues 16 and 17 of the spokes 14 and 15, respectively, as shown in Fig. 2, and said spoke seats are pressed toward each other until the distance between their outer faces is less than the distance from the flange 7 of the sleeve 6 to the other end of the sleeve.

The hub sleeve 6 is then introduced through the hub seats 10 and 11 so that the spoke seat pins 25 will project through holes 8 in hub sleeve flange 7, and hub sleeve flange 7 will engage the rear end of the rear hub seat 10; the nut 30 is then screwed on the thread 9 on the front end of the hub against the front end of the spoke seat 11 and the spoke seats are drawn together by the hub sleeve flange 7 and said nut in wedging engagement with the inner ends of the spokes 14 and 15 until the spoke seat lugs 18 and 19 engage the inner sides of the spokes, whereby the spokes are wedged outwardly an equal distance, so that the outer ends of the spokes extend all the way in the felly sleeves 21, and the felly 20 is properly centered on the outer ends of the spokes with relation to the hub portion of the wheel as shown in Fig. 2. The hub is then introduced through the hub sleeve so that the spoke seat pins 25 project through the holes 5 in the hub flange 3 and the hub flange engages the hub sleeve flange 7; the nut 31 is then screwed on the thread 4 on the front end of the hub against the front end of hub sleeve 6, drawing the hub forwardly so that the hub flange 3 firmly engages the hub sleeve flange 7, thus properly positioning the hub within the hub sleeve; the cap 35 is then screwed on the thread 4 on the front end of the hub against the front end of spoke sleeve 26, thus closing the front end of the hub and spoke sleeve as shown in Fig. 5.

The wheel is now completely assembled.

Having described my invention I claim as new and desire to secure by Letters Patent:—

1. A wheel comprising a hub, spokes, a felly, a pair of spoke seats, one of said spoke seats being adapted to seat certain spokes and the other seat being adapted to seat certain other spokes, means for holding said spokes in staggered relation, means connecting the outer ends of the spokes to the felly, a hub sleeve extending through said spoke seats, a flange on one end of said sleeve for engaging one of said spoke seats and a nut screwing on the other end of said sleeve against the other spoke seat for drawing and holding said seats in seating engagement with said spokes, a pin on one of said spoke seats, said sleeve being provided with a hole to receive said pin and said hub being provided with a hole to receive said pin whereby the hub, hub sleeve and spoke seat are locked so as to turn together.

2. A wheel comprising a hub, spokes, a felly, a pair of spoke seats, one of said spoke seats being adapted to seat certain spokes and the other seat being adapted to seat certain other spokes, means for holding said spokes in staggered relation, means connecting the outer ends of the spokes to the felly, a hub sleeve extending through said spoke seats, and a flange on one end of said sleeve for engaging one of said spoke seats and a nut screwing on the other end of said sleeve against the other spoke seat for drawing and holding said seats in seating engagement with said spokes, said hub extending through said sleeve, a flange on one end of said hub engaging the flange on the hub sleeve, and a nut screwing on the other end of the hub against the front end of the hub sleeve.

3. A wheel comprising a hub, spokes, a pair of spoke seats, inclined seats on said spoke seats for the spokes, lugs on said spoke seats, a felly, means on said felly for receiving and connecting the spokes thereto, the seats of one spoke seat being adapted to seat certain spokes, the seats in the other spoke seat being adapted to seat the other spokes, means for drawing said spoke seats into wedging engagement with said spokes until the lugs on each spoke seat engage the spokes seated in the other spoke seat, whereby the spokes are wedged outwardly and the felly properly positioned on the spokes with relation to the hub portion of the wheel.

In testimony whereof I affix my signature.

JOHN W. WILLIAMS.